Dec. 8, 1925. 1,564,611
H. S. MOUNTFORD ET AL
HINGE
Filed Oct. 13, 1922 2 Sheets-Sheet 1
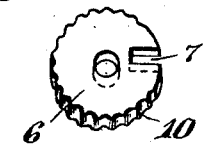
Fig. 1. 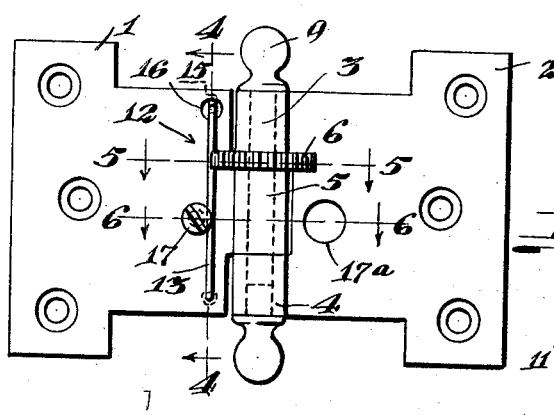 Fig. 2. Fig. 3.
Fig. 4. Fig. 5. Fig. 6.
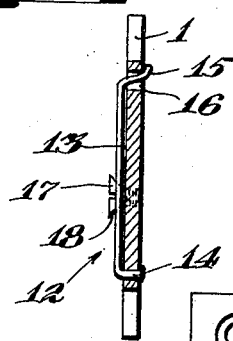 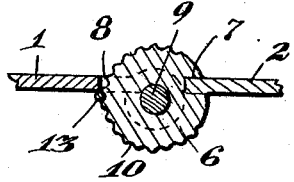 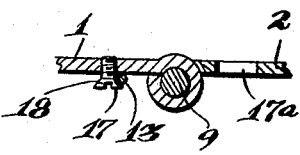
Fig. 7.
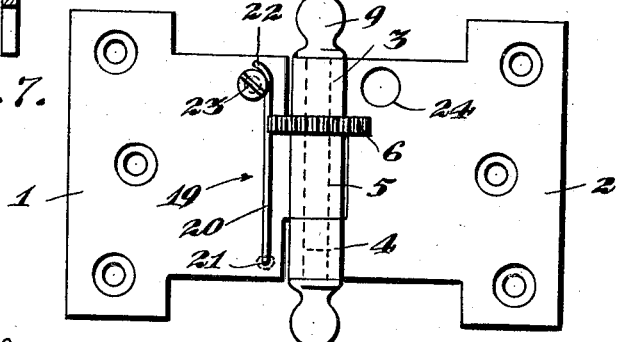
Fig. 8.
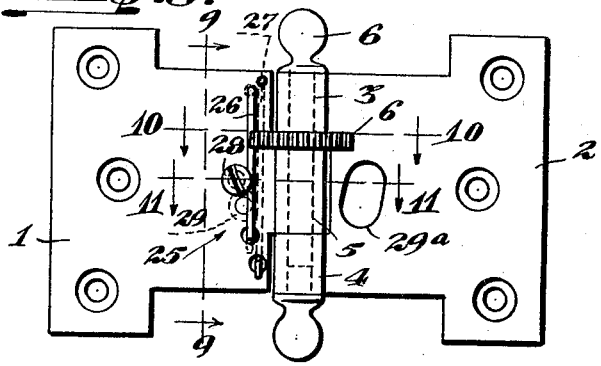
Inventors,
HOWARD S. MOUNTFORD
ELIJAH A. OVENSHIRE,
By 
Attorney Dec. 8, 1925.                                                                            1,564,611
H. S. MOUNTFORD ET AL
HINGE
Filed Oct. 13, 1922            2 Sheets-Sheet 2

Inventors,
HOWARD S. MOUNTFORD
ELIJAH A. OVENSHIRE
By

Attorney

Patented Dec. 8, 1925.

1,564,611

UNITED STATES PATENT OFFICE.

HOWARD S. MOUNTFORD AND ELIJAH A. OVENSHIRE, OF LOS ANGELES, CALIFORNIA; SAID MOUNTFORD ASSIGNOR OF HIS ENTIRE RIGHT TO JAMES FRANCIS HOOD, OF LOS ANGELES, CALIFORNIA.

HINGE.

Application filed October 13, 1922. Serial No. 594,353.

*To all whom it may concern:*

Be it known that we, HOWARD S. MOUNTFORD and ELIJAH A. OVENSHIRE, citizens of United States, residing at Los Angeles, in the county of Los Angeles and State of California, have invented new and useful Improvements in Hinges, of which the following is a specification.

Our invention relates to friction hinges and consists of the novel features herein shown, described and claimed.

An object is to make a friction hinge having means for readily adjusting the tension of the friction.

Other objects and advantages will appear.

In the drawings:

Figure 1 is an inside elevation of a friction hinge embodying the principles of our invention.

Fig. 2 is a perspective of the toothed friction disc shown in Fig. 1.

Fig. 3 is a perspective of a smooth disc which may be used as a modification of the toothed disc.

Fig. 4 is a cross sectional detail on the line 4—4 of Fig. 1, and looking in the direction of the arrows.

Fig. 5 is a fragmentary longitudinal sectional detail on the line 5—5 of Fig. 1 and looking downwardly.

Fig. 6 is a fragmentary longitudinal sectional detail on the line 6—6 of Fig. 1 and looking downwardly.

Fig. 7 is view analogous to Fig. 1 and showing a modified form of the adjustable tension spring.

Fig. 8 is a view analogous to Fig. 1 and showing two adjustable tension springs.

Figure 9:
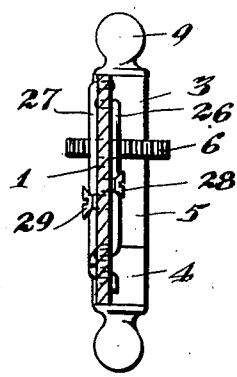
Fig. 9 is a cross sectional detail on the line 9—9 of Fig. 8 and looking in the direction of the arrows.

Referring to the drawings in detail:

The hinge leaves 1 and 2 have bearings 3, 4 and 5, the bearing 5 being between the bearings 3 and 4. The friction disc 6 fits between the bearings 3 and 5 and has a notch 7 to receive the edge of the leaf 2 and the leaf 1 has a notch 8 to receive the disc. The hinge pin 9 extends through the bearings 3, 4 and 5 and through the disc 6. This makes the disc 6 rigid with the leaf 2 and the disc has preferably a toothed friction periphery 10, as shown in Fig. 2, but the disc 11 having a smooth periphery 12, as shown in Fig. 3, may be substituted for the disc 6.

The adjustable friction construction 12 is applied to the leaf 1 and the details shown in Figs. 1 to 6 are as follows: The spring is formed of small hard wire and has a straight central portion 13, an end 14 bent at right angles, and a reversely bent end 15. The end 14 is inserted through the leaf 1 and riveted and the central portion 13 fits against the side of the leaf 1 parallel with the hinge pin 9, and against the friction disc and the end 15 is hooked through an opening 16, said opening being large enough to allow the spring to vibrate as it passes the teeth of the disc. The adjusting screw 17 is tapped through the leaf 1 against the central portion 13 and on the opposite side from the disc and between the disc and the end 14 and has a flat head with a bevelled inner face 18 bearing against the spring so that the tension of the spring against the disc may be adjusted by manipulating the screw. The friction construction will slip when sufficient force is applied to allow the leaves 1 and 2 to be moved to any desired angle relative to each other and then the leaves will be held as long as the tension of the friction is not overcome. A clearance opening 17ª is formed through the leaf 2 to receive the head of the screw 17 when the leaves are folded.

The adjustable friction construction 19 shown in Fig. 7 is a modification. The central portion 20 of the spring has an end 21 anchored to the leaf 1 by inserting the end through the leaf and riveting and has a curved opposite end and the adjusting screw 23 is tapped through the leaf 1 in position to engage the curved end 22 and press the spring against the disc. A clearance opening 24 is formed through the leaf 2 to receive the head of the screw 23 when the leaves are folded.

The adjustable friction construction 25 shown in Figs. 8, 9, 10 and 11 is a second modification and the modification consists of placing a spring 26 on one side of the leaf 1 and a spring 27 on the other side and adjusting the springs with screws 28 and 29 and making a clearance opening 29ª in the leaf 2. This is simply doubling the construction 12 shown in Figs. 1 to 6.

Figure 12:
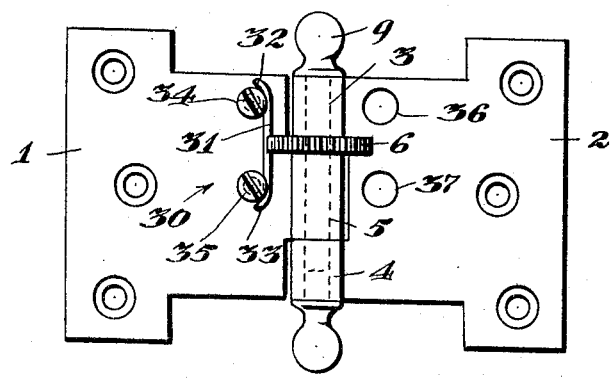
Fig. 12 is a view analogous to Fig. 1 and showing another modified form of the adjustable tension spring.
Figure 10:
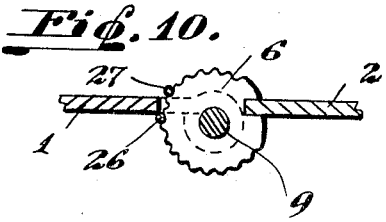
Fig. 10 is a fragmentary longitudinal sectional detail on the line 10—10 of Fig. 8 and looking downwardly.
Figure 11:
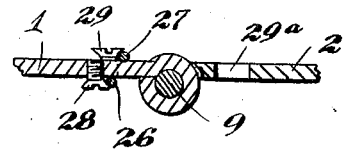
Fig. 11 is a fragmentary longitudinal sectional detail on the line 11—11 of Fig. 8.
Figure 13:
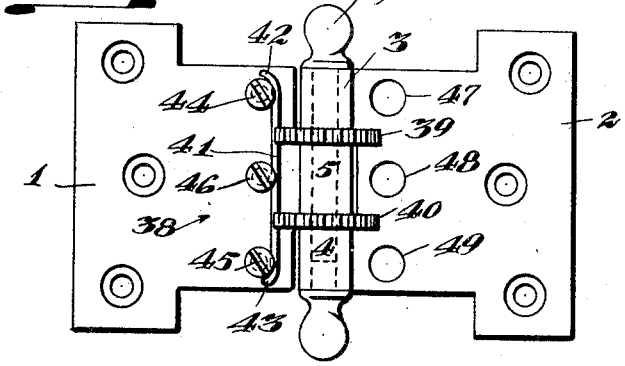
Fig. 13 is a view analogous to Fig. 12 another modification of the adjustable friction construction.
Figure 13:

The adjustable friction construction 30 shown in Fig. 12 is a third modification and consists of applying a spring 31 having curved ends 32 and 33 and applying adjusting screws 34 and 35 to engage the curved ends and press the spring against the disc, and making clearance openings 36 and 37.

The adjustable friction construction 38 is a fourth modification and consists of applying two discs 39 and 40, applying a spring 41 having curved ends 42 and 43, applying the adjusting screws 44 and 45 to engage the ends 42 and 43, applying an adjusting screw 46 to engage the spring between the discs 39 and 40, and making the clearance openings 47, 48 and 49 to receive the heads of the screws when the leaves are folded. This makes two points of friction on the spring and three points of adjustment.

Thus we have produced hinges having adjustable friction constructions. The operations and advantages are obvious.

Various changes may be made without departing from the spirit of our invention as claimed.

We claim:

1. A leaf hinge having a friction disc rigid with one leaf, a friction spring comprising a strip of wire carried by the other leaf and engaging the disc, and an adjusting screw engaging the spring for varying the friction.

2. Two hinge leaves, a hinge pin connecting the hinge leaves, a friction disc mounted upon the hinge pin and rigid with one leaf, a spring mounted upon the other leaf and engaging the disc, and an adjusting screw provided with a beveled shaped head, said head engaging the spring for varying the friction.

3. Two hinge leaves having bearings, a hinge pin connecting the bearings, a friction disc upon the hinge pin and rigid with one leaf, a spring connected at one end to the other leaf and engaging the disc, and a bevel-headed screw tapped into the last leaf and engaging the spring at a point spaced from the disc to vary the tension of the spring against the disc.

4. In a hinge, a pair of articulate hinge members, a friction element carried by one of the leaf members, a friction spring carried by the other leaf member and bearing upon said friction member, and a screw threaded in the spring-carrying leaf member having an inclined face bearing against said spring adapted, on adjusting the screw to vary the pressure of said spring on said friction element.

HOWARD S. MOUNTFORD.
ELIJAH A. OVENSHIRE.